Figure 1:
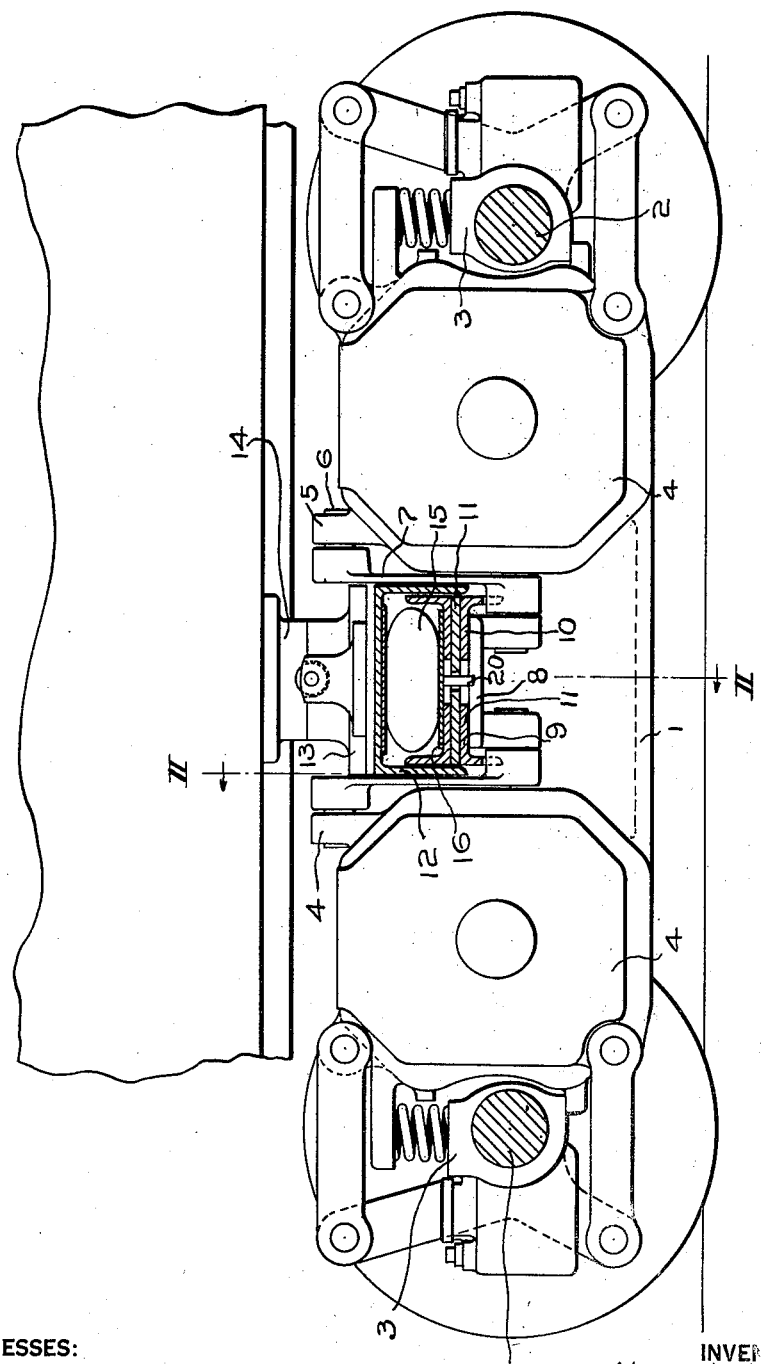

March 15, 1927. 1,621,035
N. W. STORER ET AL
VEHICLE STRUCTURE
Filed May 4, 1925   2 Sheets-Sheet 1

WITNESSES:
R. S. Harrison
W. B. Jaspert.

INVENTORS
Norman W. Storer and
Thomas S. Scott
BY
Wesley G. Carr
ATTORNEY

March 15, 1927.

N. W. STORER ET AL 1,621,035

VEHICLE STRUCTURE

Filed May 4, 1925    2 Sheets-Sheet 2

WITNESSES:
R. S. Harrison
W. B. Jaspert.

INVENTORS
Norman W. Storer and
Thomas S. Scott
BY
Wesley G. Carr
ATTORNEY

Patented Mar. 15, 1927.

1,621,035

UNITED STATES PATENT OFFICE.

NORMAN W. STORER AND THOMAS S. SCOTT, OF PITTSBURGH, PENNSYLVANIA, ASSIGNORS TO WESTINGHOUSE ELECTRIC AND MANUFACTURING COMPANY, A CORPORATION OF PENNSYLVANIA.

VEHICLE STRUCTURE.

Application filed May 4, 1925. Serial No. 27,695.

Our invention relates to railway vehicles, more particularly to railway vehicle trucks of the swing bolster type wherein provision is made for supporting the vehicle cab or frame by means of a center pin connection to the bolster member.

It is among the objects of our invention to provide a railway vehicle truck embodying a swing bolster which shall be provided with yielding cushioning means for the center pin support to yieldingly carry the load on the center pin and distribute the same over a relatively wide area.

Another object of our invention is to provide a bolster construction for vehicle trucks embodying pneumatic means for supporting the weight of the vehicle thereon which shall be of simple, compact and durable mechanical construction and which shall comprise a minimum number of parts.

Another object of our invention is to provide a swing bolster construction for vehicle trucks in which the center pin support is carried or supported on a plurality of fluid pressure columns which are connected to a common source of fluid pressure and which are isolated to constitute separate or individual pressure units.

Another object of our invention is to provide a swing bolster construction for railway vehicles that utilizes a plurality of inflatable cushions comprising outer casings or shoes and inner casings, which are severally connected by pipe lines to a source of fluid pressure to maintain a uniform pressure therein and which are provided with a one-way valve to prevent deflation of the casing members when pressure falls in the supply system.

Heretofore, swing bolster trucks have been provided with various types of spring elements to support the load on the center pin mounting by which the truck is connected to the vehicle cab or frame, or for the purpose of providing a resilient connection between the vehicle and its supporting trucks.

Our present invention is directed to a truck structure embodying pneumatic cushioning means for replacing the spring elements heretofore utilized in order to provide greater stability, eliminate breakage of the spring and other connecting members and produce a much easier riding action in vehicles so equipped, besides offering a great many structural and functional advantages which will appear from the following description of our invention.

Figure 2:
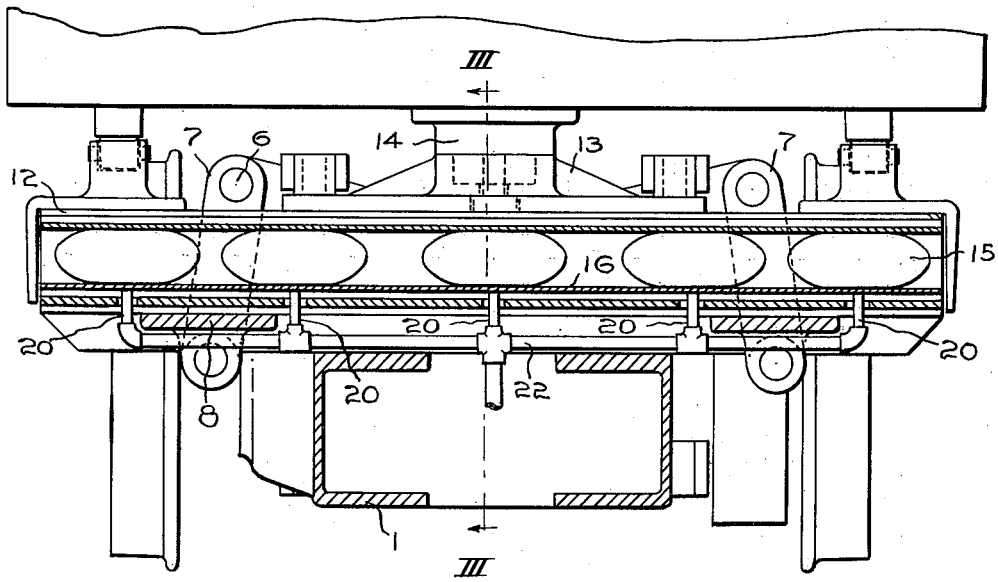
Figure 3:
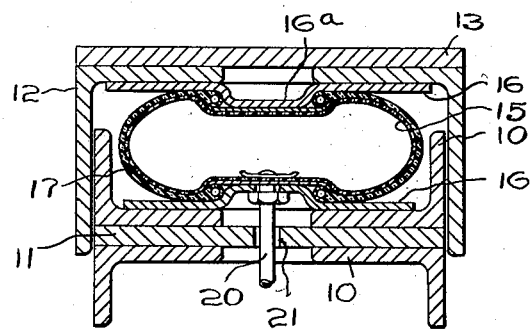

In the accompanying drawings constituting a part hereof and in which like reference characters designate like parts, Fig. 1 is a view, partially in cross section and partially in side elevation, of a railway vehicle truck, showing a fragmentary portion of the vehicle body embodying one form of our invention;

Fig. 2 is a view, partially in section and partially in end elevation, of the truck mechanism shown in Fig. 1, taken along the line II—II thereof; and, Fig. 3 is a longitudinal cross-sectional view of the swing bolster, taken along the line III—III of Fig. 1.

Referring to Figs. 1 and 2 of the drawing, the structure therein illustrated comprises a center frame member 1 (Fig. 2), journaled upon a plurality of wheeled axles 2 by the usual journal-box construction 3. A plurality of motors 4 are secured to the frame member 1 and may be operatively connected to the axles 2 by suitable gear-wheels (not shown).

The motor frames are provided with vertically extending lugs 5 having openings therein that are adapted to receive stud pins 6 of swing links 7, which are similarly engaged to the bottom frame portion 8 of a swing bolster. The bolster member 8 is provided with an I-beam section 9 that is built up of angle irons 10 and an intermediate plate 11. A pair of channel members 12 are disposed on the bolster, and a center pin mounting bracket 13, which is provided with a center pin 14, is carried by the channel member 12. The latter is yieldingly supported by a plurality of pneumatic cushions 15, which are disposed between a pair of protecting plates 16 that rest against the I-beam 9 and channel 12. The plates 16 have an offset or raised central portion 16ª, for a purpose to be set forth.

Referring to Fig. 2 of the drawing, the cushions 15 are disposed in spaced relation between the plates 16 of the bolster and are utilized in numbers corresponding to their respective capacity for carrying the load to which the center pin bracket 13 is subjected.

In Fig. 3 is shown a section of the cushion members 15, which comprises an outer casing or shoe 17 that is shaped like the shoe of an automobile tire and an inner casing 18, which is disposed therein in engagement with the offset central portions of the plates 16. A suitable valve member 19 is secured to the bottom plate 16 and the casing 18 of the cushion member, and a pipe 20, extending from the valve through an opening 21 in the member 11, connects all of the cushions to a common supply line 22, which is connected to a source of fluid pressure such as a compressor, or the like (not shown).

The cushions 15 are of such size and proportions as to provide a sufficient carrying capacity for the bolster member within the limits of satisfactory working pressures, so as to prevent blow-outs of the casing.

In operation the pneumatic cushions 15 are inflated through the supply system 22 and the valve stems 20 to carry a pressure suitable to support the load on the center pin 14, which is a substantial portion of the weight of the vehicle body and its equipment. Swinging movement between the vehicle and the truck is provided by means of the swing links 7 and the pneumatic cushion provides an otherwise stable seating effect between the vehicle and the truck that is not found in the prior type of spring supported bolsters.

With our construction the vehicle rides very smoothly and is not subject to the shock and pounding of the wheels on the rails and, furthermore, the cushioning means practically eliminates the vibration inherent in railway vehicles. This construction further materially reduces the weight of the truck and provides a sufficient yielding support for the car body.

Although we have illustrated our invention as embodied in a railway vehicle, it is obvious that it may be applied to street vehicles and for other purposes than for cushioning the bolster support. For instance, it may be applied in any manner for supporting car bodies either on their subframes or upon the trucks without the swing bolster connection.

It is evident from the foregoing description of our invention that vehicle trucks equipped with pneumatic cushioning means as herein described provide an efficient yielding support for the cab. It offers lateral stability to the vehicle body when rounding curves and upon irregular road beds and, in general, greatly improves the mounting of the vehicle upon its supporting trucks.

Although we have described a specific embodiment of our invention, it will be obvious to those skilled in the art that various modifications may be made in the details of construction, the size and proportion of the several cooperating parts and the manner of their application, without departing from the principles herein set forth.

We claim as our invention:

1. A vehicle truck comprising a frame journalled upon a plurality of wheeled axles, a swing bolster therefor, and pneumatic means within said bolster for supporting the load to which said bolster is subjected.

2. A vehicle truck comprising a frame journalled upon a plurality of wheeled axles, a swing bolster therefor, and fluid pressure means within said bolster for supporting the load to which said bolster is subjected.

3. A vehicle truck comprising a frame journalled upon a plurality of wheeled axles, a motor secured to said frame, a swing bolster movably mounted on said frame, and associated with said motor, a bolster plate carried on said bolster, and pneumatic supports for said plate.

4. A vehicle truck comprising a frame journalled upon a plurality of wheeled axles, a motor secured to said frame, a swing bolster movably mounted on said frame, and associated with said motor, a a bolster plate carried on said bolster, and a plurality of fluid-pressure devices for supporting the bolster plate.

5. A vehicle truck comprising a frame journalled upon a plurality of wheeled axles, a motor secured to said frame, a swing bolster movably mounted on said frame, and associated with said motor, a bolster plate carried on said bolster, a plurality of inflated members for supporting the bolster plate, and means for maintaining pressure in said supporting members.

6. A vehicle truck comprising a frame journalled upon a plurality of wheeled axles, a motor secured to said frame, a swing bolster movably mounted on said frame and associated with said motor, a bolster plate carried on said bolster, a plurality of inflated members for supporting the bolster plate, and a common source of fluid-pressure for said supporting members.

7. A vehicle truck comprising a frame journalled upon a plurality of wheeled axles, a swing bolster hinged on said frame, a center pin support carried on said bolster, and a plurality of air cushions disposed between said support and bolster, said cushions comprising an outer casing or shoe and an inner casing, and a source of fluid pressure connected to said inner casings.

8. A vehicle truck comprising a frame journalled upon a plurality of wheeled axles, a swing bolster hinged on said frame, a center pin support carried on said bolster, and a plurality of air cushions disposed between said support and bolster, said cushions comprising an outer casing or shoe and an inner casing, a source of fluid pressure and pipe lines having individual valves for connecting said source to the respective inner casings.

In testimony whereof, we have hereunto subscribed our names this 29th day of April, 1925.

NORMAN W. STORER.
THOMAS S. SCOTT.